US007158317B2

(12) United States Patent
Ben-Eliezer et al.

(10) Patent No.: US 7,158,317 B2
(45) Date of Patent: Jan. 2, 2007

(54) ALL OPTICAL EXTENDED "DEPTH-OF FIELD" IMAGING SYSTEM

(75) Inventors: Eyal Ben-Eliezer, Kiriat Haim (IL); Zeev Zalevsky, Rosh Haayin (IL); Emanuel Maron, Tel Aviv (IL); Naim Konforti, Holon (IL); David Mendlovic, Petach Tikva (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 0 days.

(21) Appl. No.: 10/504,162

(22) PCT Filed: Mar. 13, 2003

(86) PCT No.: PCT/IL03/00211

§ 371 (c)(1),
(2), (4) Date: Aug. 11, 2004

(87) PCT Pub. No.: WO03/076984

PCT Pub. Date: Sep. 18, 2003

(65) Prior Publication Data

US 2005/0094290 A1    May 5, 2005

(51) Int. Cl.
*G02B 9/00*      (2006.01)
*G02B 9/08*      (2006.01)
(52) U.S. Cl. .................................................... 359/738
(58) Field of Classification Search ................ 359/721, 359/738–743, 800, 811–813, 819, 821–823; 396/529–531
See application file for complete search history.

(56) References Cited

U.S. PATENT DOCUMENTS

| 5,071,207 A | * | 12/1991 | Ceglio et al. .................. 359/15 |
| 5,262,893 A | * | 11/1993 | Shrauger et al. ............. 359/565 |
| 6,409,141 B1 | * | 6/2002 | Yamazaki et al. ........... 359/742 |
| 6,927,922 B1 | * | 8/2005 | George et al. ............... 359/721 |

OTHER PUBLICATIONS

Goodman; Introduction to Fourier optics, Chapter 6—Frequency Analysis of Optical Imaging Systems—McGraw-Hill, New York 1996, pp. 126-151.
H Hopkins Optica Acta, , vol. 13, No. 4 1966, p. 343-369.

* cited by examiner

*Primary Examiner*—Alicia M Harrington
(74) *Attorney, Agent, or Firm*—Mark M. Friedman

(57) ABSTRACT

The instant invention is an optical imaging system that produces images of acceptable quality of objects which are located at a wide variety of distances from the optical imaging system. A preferred embodiment of the optical imaging system includes an object (10), an auxiliary lens (12), a composite phase marsk (14) and a detector (18) arranged along an optical axis (20). Light from the object (10) is focused by the auxiliary lens (12) in tandem with the composite phase mark (14), producing an image (16) which is incident th detector (18).

22 Claims, 10 Drawing Sheets

30

32

50

52

60

62

70

72

ALL OPTICAL EXTENDED "DEPTH-OF FIELD" IMAGING SYSTEM

FIELD AND BACKGROUND OF THE INVENTION

The present invention relates to an optical imaging system, and, more particularly, to an all-optical extended focus imaging system including a multiplexed set of Fresnel lenses (FL's), such that the optical imaging system of the present invention produces clear images of objects at a variety of distances from the optical imaging system without requiring mechanical refocusing, although with a sacrifice of contrast and resolution when compared with an image produced by a sharply focused lens or lens system of similar size. Similarly, the present invention reduces the sensitivity of image quality to the distance of the detector from the optical imaging system.

Various attempts have been made to provide optical imaging systems which can produce sufficiently sharp and bright images of objects whose distances from the optical imaging system are variable, or in situations where the distance from the optical imaging system to the detector may not be precisely controlled.

The depth of field (DOF) of an optical imaging system is the range of distances from the optical imaging system at which an object can be placed such that the image of the object will be acceptably well-focused.

It is well known to those skilled in the art that the depth of field of a lens system is increased by reducing the aperture of the lens. However, reduction of the aperture of the lens reduces the brightness of the image. Diffraction effects associated with small apertures also cause blurring of the image.

Automatic focus systems are also well known to the art. However, automatic focus systems take time to focus, add weight and complexity to the optical system, require a source of power, often make unwanted acoustic noise, and sometimes do not focus on the object of interest but instead on some other object. Automatic focus systems also are not adequate in situations where it is desired to obtain an image of more than one object simultaneously, where the objects are not at the same distance from the optical imaging system.

It is well known that imaging systems are sensitive to misfocus, i.e., variations in image or object plane location. See, for example, J. W. Goodman, *Introduction to Fourier Optics*, McGraw-Hill, New York, 1996, pp.126–151, which is incorporated by reference for all purposes as if fully set forth herein. Many attempts have been made to reduce this sensitivity, in order to obtain an increased depth of field. Some approaches were based on using apodized apertures, meaning absorptive masks in the pupil aperture, as well as stopping the aperture down. In all-optical approaches, an increase in tolerance in the position of the image or object location is coupled with a decrease in optical power throughput, as well as image resolution reduction. Recently, hybrid, opto-digital approaches that overcome these deficiencies by using a non-absorptive phase mask and digital post-processing restoration operations have been demonstrated in the literature. Unlike the all-optical approach of the present invention, the hybrid approaches require an electronic processing stage to follow the optical acquisition.

There is thus a widely recognized need for, and it would be highly advantageous to have, an optical imaging system that produces images of acceptable quality of objects at a wide variety of distances from the optical imaging system without the need to adjust the focus of the optical imaging system.

SUMMARY OF THE INVENTION

The present invention is an all-optical imaging system with extended depth of field. The image is acquired in real time without the need for a post processing stage, even in cases that, in prior-art all-optical systems, would result in severe misfocus.

The main advantage of the imaging system of the present invention is its large DOF and the fact that it can also provide focal ranges that consist of separate regions, even non-congruent ones. This possibility cannot be achieved with any known conventional optical system.

As used herein, the term "discontiguous" means regions that are not contiguous.

As used herein, the term "diffractive optical element" (DOE) means an element deflecting light beams by spatial frequencies according to the phenomenon of diffraction.

As used herein, the term "pixel" refers to an element of a structure, and may itself contain more detailed structure.

According to the present invention there is provided an imaging system for focusing images on a detector, the imaging system including: (a) an optical axis; and (b) a diffractive optical element (DOE) such as a plurality of mutually exclusive portions distributed transversely relative to the optical axis of the imaging system, each portion including a respective focusing mechanism that has a respective focal range that is different from the focal range of the respective focusing mechanism of any other the portion, the focusing mechanisms operative to produce on the detector respective substantially focused images of the objects within the focal ranges.

According to the present invention there is provided a method for focusing images of an object on a detector including the steps of: (a) providing an imaging system including: (i) an optical axis; and (ii) a diffractive optical element such as a plurality of mutually exclusive portions arranged transversely relative to the optical axis of the imaging system, each portion including a respective focusing mechanism that has a respective focal range that is different from the focal range of the respective focusing mechanism of any other the portion, the focusing mechanisms operative to produce on the detector substantially focused images of objects within the focal ranges, and (b) having the object within the focal range of at least one of the focusing mechanisms.

The imaging system of the present invention is a plurality of mutually exclusive "portions" arranged transversely relative to an optical axis to form a diffractive optical element. Each "portion" is (or, more generally, includes) a focusing mechanism, such as a Fresnel lens, that has a respective focal range that is different from the respective focal range of the focusing mechanism of any other "portion". The element can be designed to be a stand-alone focusing device, or can be designed to be used with a lens in tandem. The focusing mechanisms focus onto a detector substantially focused images of objects within the focal ranges of the focusing mechanisms.

Preferably, at least one of the "portions" includes discontiguous subportions. Most preferably, the discontinuous subportions are distributed among respective sections, of the imaging system, that are arranged in a tiling, most preferably a regular or periodic tiling, selected from the group consisting of triangular tiling, rectangular tiling, square tiling, hexagonal tiling, tiling of elliptical elements, tiling of circular elements, and any other regular tiling. Most preferably, the discontiguous subportions that lie in any given section are arranged, in that section, in a tiling, most preferably a regular or periodic tiling, selected from the group consisting of triangular tiling, rectangular tiling, square tiling, hexagonal tiling, tiling of elliptical elements, tiling of circular elements, and any other regular tiling. For example, in the preferred embodiment discussed below, the focusing mechanisms are Fresnel lenses, each subportion is a pixel of one of the Fresnel lenses, and the sections are super-pixels arranged in a square tiling, or grid, such that each super-pixel includes a square tiling of pixels, one pixel from each of the Fresnel lenses. In one variant of the present invention, the relative positions of the subportions within the sections are the same for all sections ("regular periodic distribution"). In another variant of the present invention, the relative positions of the subportions within the sections are different, for example varying pseudo-randomly ("pseudo-random distribution"), for different sections. The super-pixels can have any shape (circular, rectangular, hexagonal, etc). The tiling of the subportions can also have any shape (rectangular, triangular, hexagonal, etc.), although it is often convenient if the same shape is chosen for the super-pixels and the subportions.

In the preferred embodiment discussed below, the focusing mechanisms are Fresnel lenses. More generally, the preferred focusing mechanisms are Fresnel focusing mechanisms generally.

Preferably, the "portions" are portions of a composite phase mask, and the imaging system of the present invention also includes an auxiliary focusing mechanism, such as a lens, mirror or hologram, in tandem with the composite phase mask and with the detector along the optical axis.

Preferably, the "portions" produce substantially overlapping images on the detector.

Preferably, the focal ranges of the "portions" at least partly overlap. Alternatively, the focal ranges of the "portions" are mutually exclusive.

Preferably, the portions are portions of a diffractive optical element.

The method of the present invention consists of focusing images of an object on a detector by placing the object within the focal range of at least one of the focusing mechanisms of an imaging system of the present invention.

The present invention successfully addresses the shortcomings of the presently known imaging systems by providing an economical and quiet imaging system with a wide tolerance for focusing error, without significant additional weight or the need for an additional source of power.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an optical imaging system that produces images of acceptable quality of objects located at a wide variety of distances from the optical imaging system. The present invention also reduces the sensitivity of image quality to the distance from the optical imaging system to the detector.

Specifically, the present invention can be used to produce images of acceptable quality for a wide range of distances from the object to the optical imaging system, and with reduced sensitivity to the distance from the optical imaging system to the detector by the use of a diffractive optical element (DOE) mask, that may include, inter alia, a multiplexed set of Fresnel lenses in conjunction with a lens, or else it may integrate the lens, too, into its structure. Such an element may be fabricated by etching a pattern into a substrate with the use of several masks, in sequence, as is commonly done in the fabrication of DOE's. Once an element, or a complementary or negative cast of an element, is fabricated, the element is easily replicated by stamping, molding, etc.

The present invention is a real-time all-optical incoherent imaging system that is tolerant of misfocus. The preferred embodiment of the present invention is based on a non-absorptive composite phase mask (CPM), consisting of several spatially multiplexed FLs, in conjunction with a single primary lens.

The principles and operation of an all-optical extended focus imaging system according to the present invention may be better understood with reference to the drawings and the accompanying description.

Figure 1A:
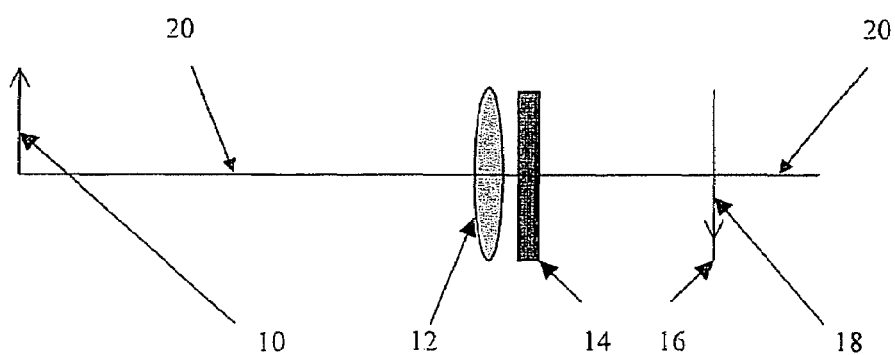
FIG. 1a is a schematic illustration of an optical imaging system according to the present invention.

Referring now to the drawings, FIG. 1a illustrates schematically one preferred embodiment of an optical imaging system according to the present invention. An object 10, an auxiliary lens 12, a composite phase mask 14 and a detector 18 are all arranged substantially along an optical axis 20. Light from object 10 is focused by auxiliary lens 12 in tandem with composite phase mask 14, producing an image 16 that falls on detector 18.

Figure 1B:
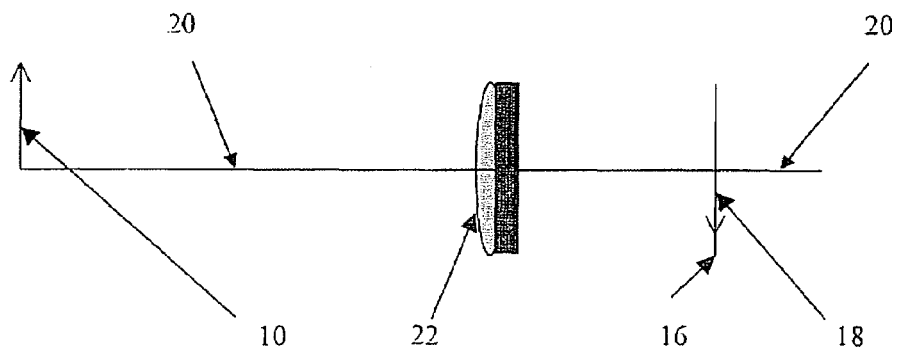
FIG. 1b is a schematic illustration of an optical imaging system according to the present invention wherein the composite phase mask and the auxiliary lens are constructed as a single element.

FIG. 1b illustrates schematically a variation of this preferred embodiment of the present invention wherein the composite phase mask and the lens are constructed as a single element 22.

The system of the present invention requires only a single detector 18. Satisfactory detectors 18 include, but are not limited to, photographic film, photographic plates, photographic emulsions, imaging tubes, living retinae, charge-coupled device array (CCD array) detectors, CMOS detectors, other pixilated detectors, etc.

Figure 2:
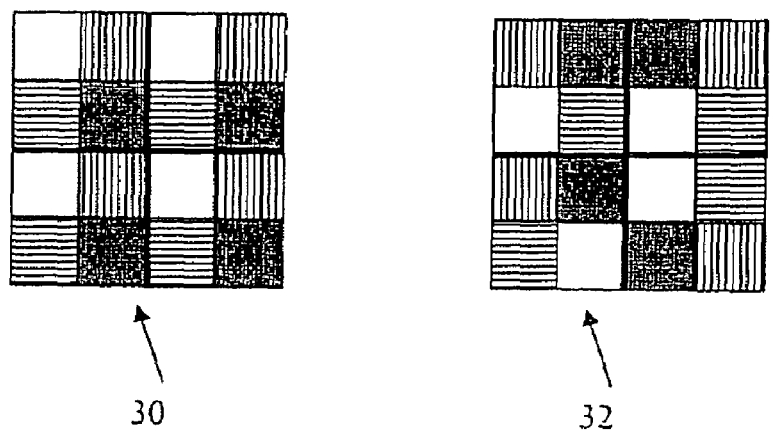
FIG. 2 illustrates two representations of four super-pixels, each containing four sub-pixels, for a regular periodic distribution vs. a pseudo-random distribution.

Composite phase mask 14 consists of a set of sparse interlaced Fresnel lenses occupying mutually exclusive sections of the mask area. In this preferred embodiment, sixteen Fresnel lenses are combined in one phase mask 14 by sub-dividing each information pixel, also known as a "super-pixel", of phase mask 14, into sixteen sub-pixels in one of two different configurations, the first configuration being called a "regular periodic arrangement", and the second configuration being called a "pseudo-random arrangement". Examples of these two arrangements are illustrated in FIG. 2, where, for simplicity, only four sub-pixels are shown for each super-pixel and, again for simplicity, those sub-pixels have been drawn as squares. However, the use of any other configuration or shape is also within the scope of the present invention. In a regular periodic arrangement 30, the sub-pixels of any particular Fresnel lens are located in the same relative position in each and every super-pixel, while in a pseudo-random arrangement 32 the sub-pixels of any particular Fresnel lens are located in positions relative to each super-pixel that are allowed to vary from one super-pixel to another. As used herein, the term "pseudo-random arrangement" also includes a random arrangement.

In this particular preferred embodiment of the present invention, sixteen Fresnel lenses are combined in the composite phase mask. However, other numbers of Fresnel lenses may be used, and are within the scope of the present invention.

In a limiting case of this particular preferred embodiment of the present invention the aperture is divided into sixteen sections, one for each Fresnel lens having a specific focal length. However, the quality of the response of the system is improved when these Fresnel lenses are distributed, as described herein.

When the DOE includes a multiplexed distribution of Fresnel lenses, each FL is a corrective lens that produces, in tandem with the auxiliary lens, a sharply focused image for a different object plane. Inherently, each FL provides a relatively small depth of field around the FL's perfectly imaged object plane. Note that the terms "depth of field" and "focal range" are used interchangeably herein. In this preferred embodiment, these separate DOFs are made to slightly overlap so as to provide good focusing over a single extended range. The total DOF of the imaging system, resulting from the contributions of the DOFs of the respective individual FLs, is extended in comparison to that provided by the primary lens with the same pupil size. Although the DOF's of the FL's are made to overlap, other arrangements are possible, such as grouping the DOF's into two or more groups in order to produce interesting and useful effects such as sharply focusing on near and far objects while objects at an intermediate range are not focused sharply or not focused at all.

The intensity impulse response of the composite lens is the square of the absolute value of the coherent impulse responses of the individual FL contributions:

$$|h(x, y)|^2 = \left|\sum_k h_k(x, y)\right|^2 \quad (1)$$

The coherent impulse response of the k'th FL is denoted by $h_k(x, y)$, where x and y are the spatial coordinates in the image plane. Because the DOFs of individual FLs are designed so that they slightly overlap, each input plane location within the total DOF region is sufficiently close to an input plane that is imaged by a certain FL, say $h_l(x, y)$. Thus, the image obtained for that particular location contains high resolution imagery from one FL, and poor resolution (blurred) contributions from all others:

$$|h(x, y)|^2 = \left|h_l(x, y) + \sum_{k \neq l} h_k(x, y)\right|^2 \quad (2)$$

$$= |h_l(x, y)|^2 + 2\text{Re}\left\{h_l(x, y)\sum_{k \neq l} h_k^*(x, y)\right\} +$$

$$\left|\sum_{k \neq l} h_k(x, y)\right|^2$$

The high quality of the resulting image is provided by the first term, as well as some limited contributions from the second term, while the remainder provides the blur, or the background illumination, on which the entire image "rides".

Due to these additional terms, contrast reduction and degradation in image quality are inevitable. One should note though that the image is obtained in real time, without the need for any processing steps, over the entire extended DOF. There is no need for a separate mechanism, such as a mechanical arrangement to move the lenses, to focus the image, because the DOF of the focusing mechanism consisting of the auxiliary lens in tandem with the composite phase mask is very large. However, if it is desired, the present invention may be used in conjunction with an additional mechanical focusing mechanism to extend the useful range of the imaging system of the present invention even further, and such an arrangement is within the scope of the present invention.

Composite phase mask (CPM) 14, located in the pupil plane of the imaging system, is essentially the core of the system. CPM 14, which is essentially a DOE, includes a set of $N^2$ FLs that occupy mutually exclusive regions of the mask area. In this preferred embodiment, each FL consists of square pixels of width B. The system aperture (pupil) is divided into super-pixels, whose lateral dimension is chosen to be NB; thus each super-pixel contains $N^2$ pixels. Each FL is allocated at least one pixel within each super-pixel. Thus, the CPM is composed of $N^2$ sparsely distributed FLs. In this preferred embodiment N=4, so that sixteen FLs are spatially multiplexed in one mask by sub-dividing the area of each super-pixel into sixteen pixels and allocating each pixel to a different FL. One possible arrangement of pixels within a super-pixel is a regular periodic arrangement. Another possible arrangement of the pixels within a super-pixel is a pseudo-random arrangement. These two arrangements are illustrated in FIG. 2. In a regular periodic distribution 30 pixels belonging to the same FL occupy the same relative position in each super-pixel. In a pseudo-random distribution 32 pixels belonging to the same FL occupy sites that vary from super-pixel to super-pixel.

Figure 3:
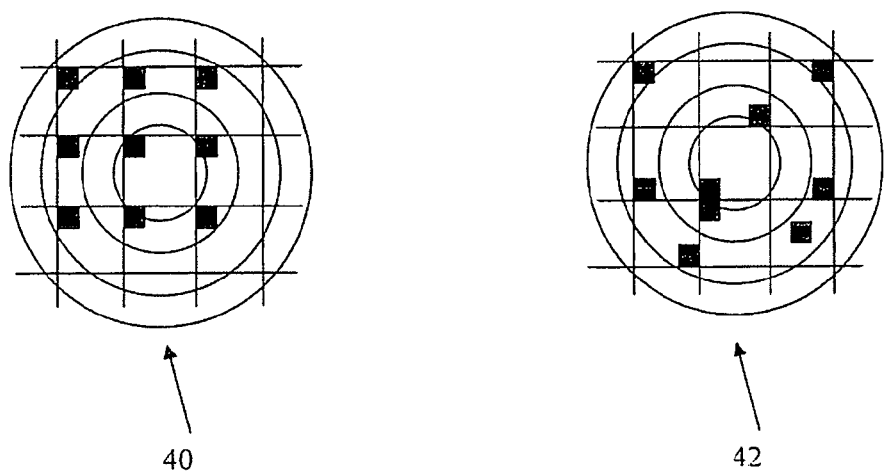
FIG. 3 illustrates a typical sampling scheme of a Fresnel lens, for a regular periodic distribution vs. a pseudo-random distribution.

The pixels within a super-pixel are spatially separated, mutually exclusive, never overlap and fill the whole super-pixel area, so that CPM 14 does not contain any unoccupied areas. The pixels sample individual FLs, as shown schematically in FIG. 3 for a regular periodic arrangement 40 and a pseudo-random arrangement 42.

When the imaging condition, $$\frac{1}{d_{object}} + \frac{1}{d_{image}} = \frac{1}{f} \quad (3)$$

is not satisfied, misfocus aberrations occur. The misfocus aberration is measured by the maximal phase shift that it produces at the aperture edge. For an optical system consisting of a single lens with a focal length f and a square aperture of width L, and object and image plane locations $d_{object}$ and $d_{image}$, respectively, the dimensionless misfocus parameter $\Psi$ is given by:

$$\psi = \frac{\pi L^2}{4\lambda}\left(\frac{1}{d_{object}} + \frac{1}{d_{image}} - \frac{1}{f}\right) = \frac{2\pi}{\lambda}W_{20} \quad (4)$$

where:
L=the aperture width,
λ=the wavelength of the light,
$d_{object}$=the distance from the object to the optical imaging system,
$d_{image}$=the distance from the image to the optical imaging system,
f=the focal length of the optical imaging system, and
and $W_{20}$=the maximum phase shift at the aperture edge, measured in terms of wavelengths.

Figure 4:
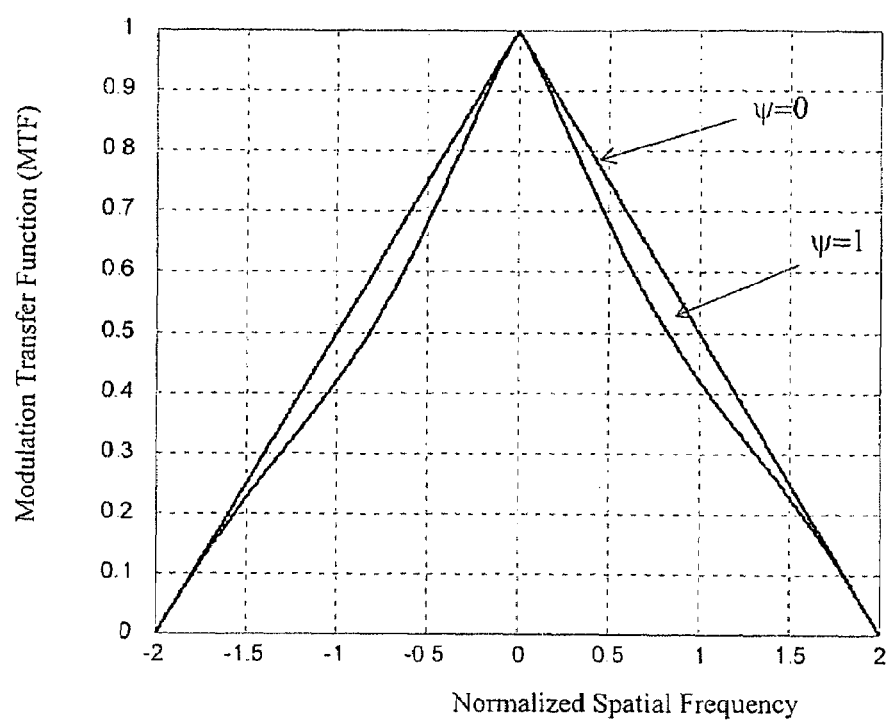
FIG. 4 illustrates the modulation transfer function (MTF) of a diffraction-limited imaging system for the "in focus" condition ($\Psi=0$), and misfocus at the Hopkins criterion limit ($\Psi=1$)

It is common practice to rely on the "Hopkins criterion" for determining the DOF. See H. H. Hopkins, Optica Acta, 13, 1966, p. 343, which is incorporated by reference for all purposes as if fully set forth herein. This criterion states that, for a single-lens imaging system, the image quality is acceptable if the misfocus parameter, $\Psi$ in Eq. 3, is smaller than 1. The MTF of a diffraction-limited imaging system for $\Psi$=0 and $\Psi$=1 is shown graphically in FIG. 4. The use of the Hopkins criterion is extended herein in order to determine the locations of the object planes that have to be perfectly imaged by the individual FLs that form the composite phase mask.

Each FL provides a focal power expressed in terms of the maximal phase shift, $\psi_k$:

$$P_k(u,v) = \begin{cases} \exp[-j\psi_k(u^2+v^2)]M_k(u,v) & |u|\leq 1; |v|\leq 1 \\ 0 & \text{else} \end{cases} \quad (5)$$

where u and v are normalized coordinates with respect to the fill pupil size, and $M_k(u,v)$ is the mutually exclusive pupil area associated with the k'th FL. In tandem with the primary common lens, each FL provides an effective focal length of:

$$\frac{1}{f_k} = \frac{1}{f} + \psi_k \frac{4\lambda}{\pi L^2} \quad (6)$$

Thus, for a fixed image (detector) plane location, the location of the perfectly imaged object plane that corresponds to the k'th FL, is given by the imaging condition $$\frac{1}{d_{obj;k}} + \frac{1}{d_{image}} = \frac{1}{f_k} \quad (7)$$

It should be noted that, as used herein, the term "in-focus object plane" refers to the plane at a distance $d_{object}$ from the lens that corresponds to the image plane location when only the primary common lens focal length is considered. The misfocus parameter, used in the simulations of this invention, is measured from this in focus object plane. In this preferred embodiment of the present invention neighboring DOFs slightly overlap each other, or at least border on each other, so that within the extended range, any object plane will be sufficiently close to at least one of the perfectly imaged planes. It should also be noted that the term "perfectly imaged plane" is meant herein to indicate that there exists a certain sparse FL, which if used alone, would provide a focused image for that plane. Using CPM 14 one thus obtains an image that is composed of the perfect image due to one FL, as well as the contributions of all of the other, misfocused FL's, per Eq. 2. The Hopkins criterion had been defined in the technical literature for a single lens. The Hopkins criterion, applied with respect to each individual FL as if acting alone, is used to determine the focal length distribution of the FLs, although it is clear that the composite lens consisting of a number of such FL's does not perform according to this criterion and the image degradation is greater. Nevertheless, the Hopkins criterion provides a rule for the maximum separation of the "perfectly imaged planes". The choice of more closely spaced perfectly imaged planes so that the perfectly imaged planes of the individual FLs is separated by less than the Hopkins criterion requirement would result in a smaller overall DOF for the system, but a higher contrast.

Therefore, using the Hopkins Criterion for determining the separation of FLs, one gets:

$$\Delta\psi \equiv |\psi_{k+1} - \psi_k| \leq 2 \quad (8)$$

The entire aperture is used for the computation of the phase shift tolerance, because each FL is sparsely distributed over the whole aperture. The largest DOF range allowed, based on Hopkins criteria, is obtained when $\Delta\psi=2$. Although it is not necessary, in this preferred embodiment the DOF is chosen to be symmetric with respect to the "in focus" plane for reasons of symmetry. Thus, because this preferred embodiment includes sixteen FLs, the misfocus parameter $\psi$ that corresponds to the extreme position of the DOF under consideration, is $|\psi_{max}|=15$. As a result, preferably the FLs are distributed so that:

$$\psi_k=-15+2k; k\in\{0 \ldots 15\} \quad (9)$$

Figure 5:
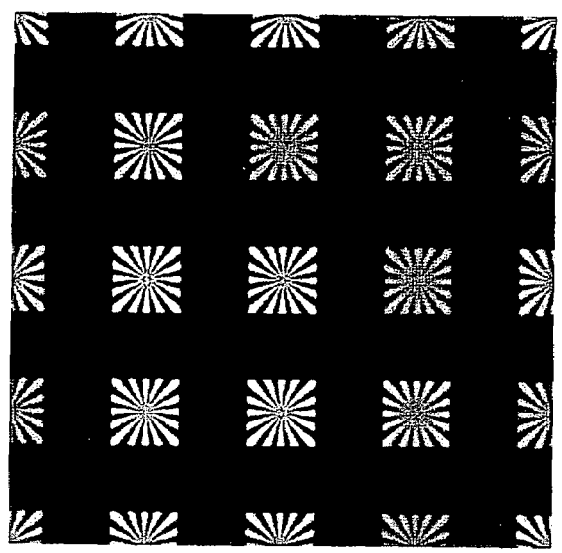
FIG. 5 illustrates an output image of a small spoke target obtained with a system including a CPM including a regular periodic distribution of pixels within each super-pixel of the CPM, vs. an output image of the same target obtained with a CPM including a pseudo-random distribution of pixels within each super-pixel of the CPM.
Figure 5:
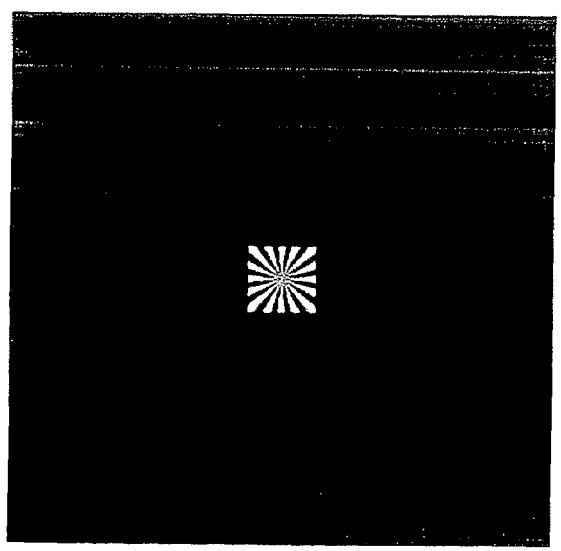
Figure 6:
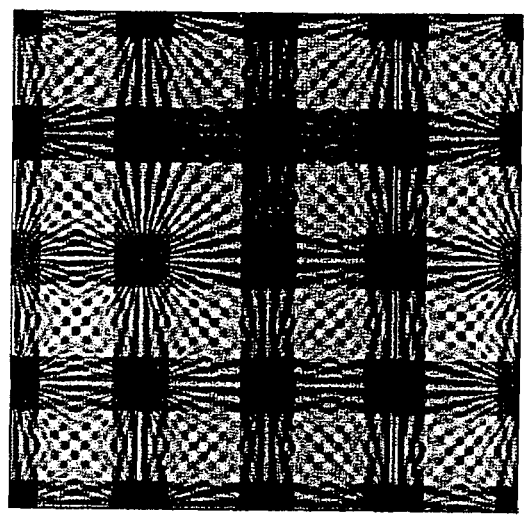
FIG. 6 illustrates an image of a large spoke target (800× 800 pixels) obtained with a system including a CPM including a regular periodic distribution of pixels within each super-pixel of the CPM, the image exhibiting prominent aliasing, vs. an image, with no noticeable aliasing, of the same target, obtained with a CPM including a pseudo-random distribution of pixels within each super-pixel of the CPM.
Figure 6:
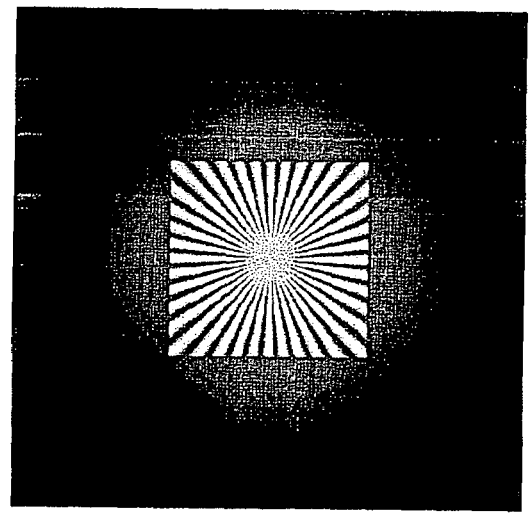

The intensity impulse response distribution in the output plane for the regular periodic arrangement of CPM 14 is very different from the intensity impulse response distribution in the output plane for the pseudo-random arrangement of CPM 14. In the former, the intensity impulse response contains replicas, whose period is inversely proportional to the super-pixel dimension. The replicas do not look alike because different pixel positions within a super-pixel, allocated to same FL, provide different phase terms to each FL contribution $h_k(x, y)$, except for the on-axis replication. FIG. 5 shows the output intensity pattern 50 for a regular periodic arrangement CPM 14, and the output intensity pattern 52 for a pseudo-random arrangement CPM 14 for the case of a spoke target image. Image 50 produced by the regular periodic arrangement CPM 14 includes replicas of the image, caused by aliasing, while the intensity impulse response of the pseudo-randomly distributed CPM 14 has a single peak around the origin and small values elsewhere, thus reconstructing a single replica of the target in image 52. Here, the intensity around the axis is approximately the square of the absolute value of the summation of the amplitude impulse responses of the individual FLs. Examination of FIG. 5 indicates that the pseudo-randomly arranged CPM 14 can handle larger size images due to the absence of replicas. This has been indeed tested in the example displayed in FIG. 6, in which the image 60 obtained for a regular periodic arrangement CPM 14 is severely distorted by adjacent replicas because the object, not shown, is of a large size. Only a small central area is not affected. On the other hand, the image 62 obtained for a pseudo-random arrangement CPM 14 is clearly recognizable over its entirety, although its contrast is reduced. Therefore the space bandwidth product of the pseudo-random arrangement is larger because it allows handling of larger size inputs. It should be noted that the dynamic ranges of images 60 and 62 differ, thus not allowing visual comparison of the details contained in those images.

Figure 7:
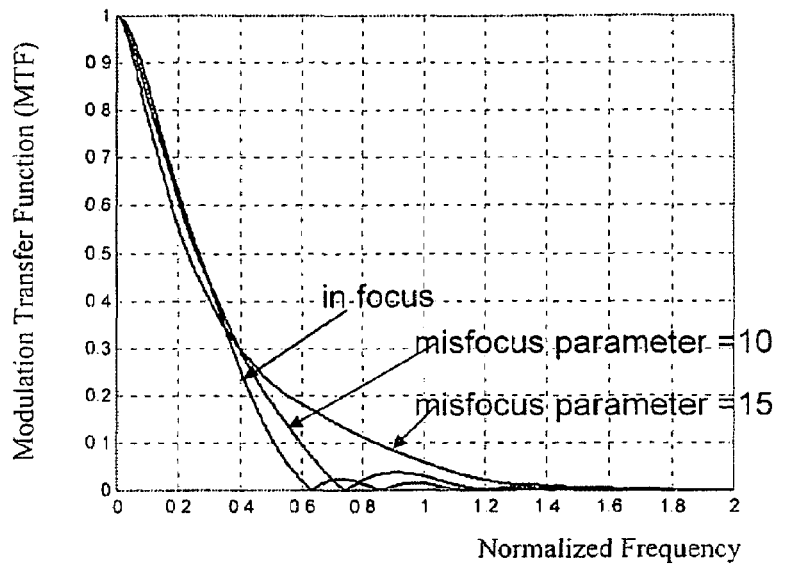
FIG. 7 illustrates MTF for a regular periodic composite phase mask for three "misfocus" conditions: $\Psi=0$, 10, and 15; and MTF for a diffraction-limited imaging system for $\Psi=0$ and 15.
Figure 7:
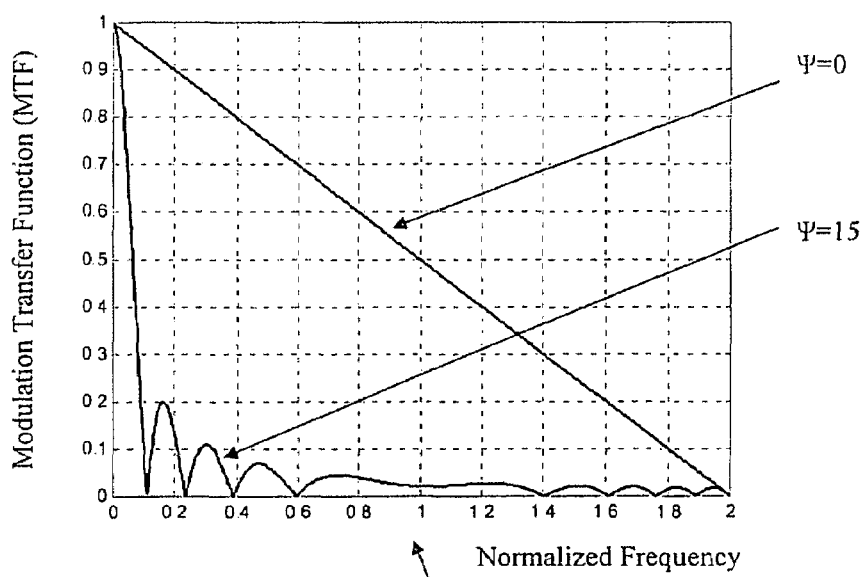

The modulation transfer function (MTF) of a regularly arranged CPM 14, calculated for misfocus conditions of $\psi=0$, 10, and 15, is plotted in the upper portion 70 of FIG. 7. The results are given along with the in-focus MTF of a single full-aperture lens. The MTF for a pseudo-randomly arranged CPM 14 is not shown here because its behavior is very similar to that shown for the regular periodic case.

It is interesting to note that the MTF obtained for objects situated at the extremity of the DOF region (identified by $\psi=15$ in this example) is better than that exhibited at the center of the DOF (for which $\psi=0$). The reason is that in the first case ($\psi=15$) most of the FL contributions are far away and they just contribute to the general illumination level (background intensity), only a very few FLs that are located in the vicinity of $\psi=15$, say $\psi=13$, 11, contribute specifically, usually in an undesired way, to the MTF of the system. On the other hand, for a plane positioned in the center of the DOF, there are twice as many FLs that contribute, mostly undesirably, to the MTF performance and thus degrade the composite MTF response.

Experiments have been carried out for a system with a nominal object location of 0.4 m, primary lens focal length of 89 mm, a square aperture of 6 mm width, and using a spatially incoherent quasi-monochromatic illumination of 632.8 nm wavelength. The illuminated object was allowed to take any position in the range of $0.353$ m$<d_{object}<0.462$ m, or approximately 27% of the nominal distance, which corresponds to a misfocus condition of $|\psi_{max}|=15$.

Figure 8:
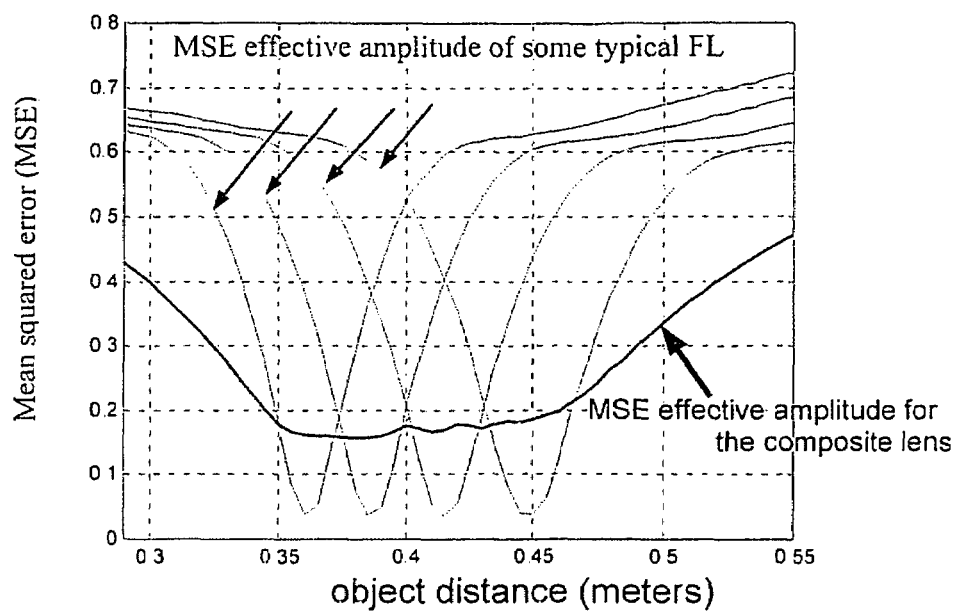
FIG. 8 is a graph of the mean square error (MSE) of effective amplitude between an output image of an optical imaging system according to the present invention and best achievable image (BAI), along with the MSE of effective amplitude obtained for four different sparsely distributed FLs.

The mean square error (MSE) effective amplitude between the output image, obtained in the presence of CPM 14, and the best achievable image (BAI), which is the image that would be obtained if a focused single lens where used instead of CPM 14, is shown graphically in FIG. 8. The MSE effective amplitude is calculated according to the formula:

$$MSE_{eff\,amp} = \sqrt{\frac{\int\int|Im(x, y) - BAI(x, y)|^2 dx dy}{\int\int|BAI(x, y)|^2 dx dy}} \quad (10)$$

On the same axes in FIG. 8 are also plotted the MSE for several of the FL's that are included in CPM 14.

It should be noted that although each FL provides a high-resolution image in a limited DOF region, the total image quality is lower, due to the interaction of all the other misfocused FLs; nevertheless the overall response extends over a wider region, which is the effective DOF of the imaging system.

Figure 9:
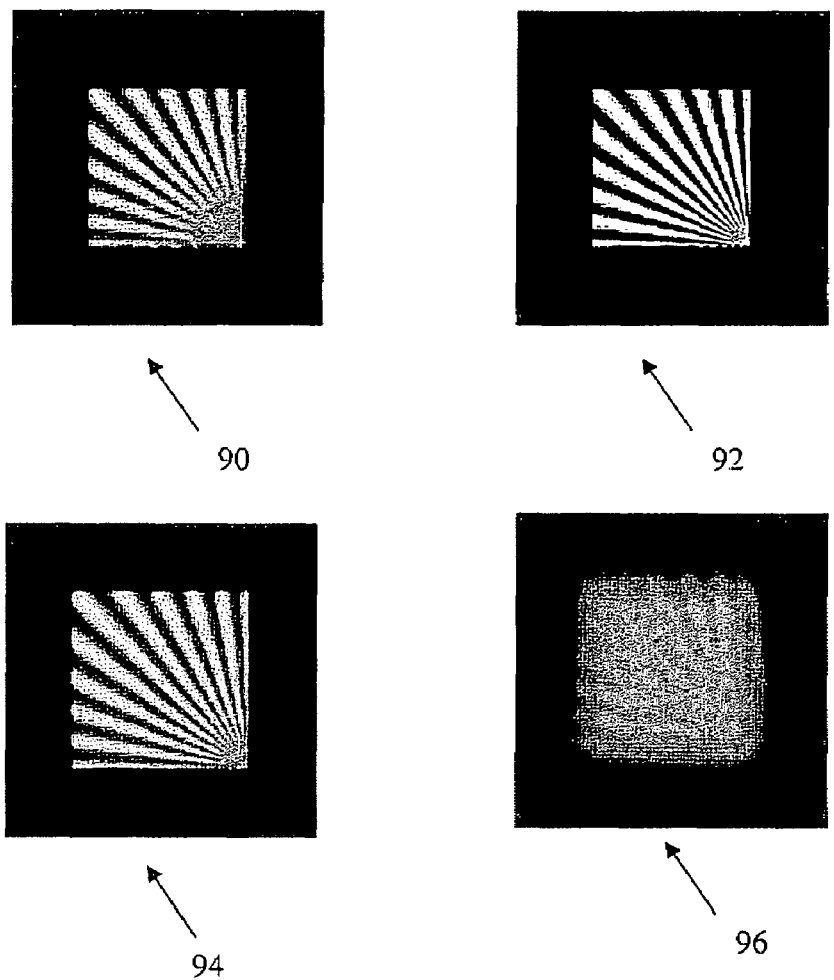
FIG. 9 is a performance comparison for images obtained with a composite phase mask including a regular periodic distribution of pixels within each super-pixel of the CPM (left column) vs. images obtained with single lens that is focused at $d_{object}=0.4$ m (right column), the exhibited images being of a spoke target located at $d_{object}=0.4$ m (top row) and $d_{object}=0.353$ m (bottom row)

FIG. 9 shows in the left column spoke target images 90 and 94 obtained with CPM 14, and in the right column spoke target images 92 and 96 obtained with a single lens with fixed focus. In the upper images 90 and 92 the object distance is $d_{object}=0.4$ m, corresponding to an out of focus parameter of $\Psi=0$ for the single lens. In the lower images 94 and 96 the object distance is $d_{object}=0.353$ m, corresponding to an out of focus parameter of $\Psi=15$ for the single lens. It should be noted that the displayed images have different lateral sizes due to the different optical geometric magnification obtained in the respective positions.

Figure 10:
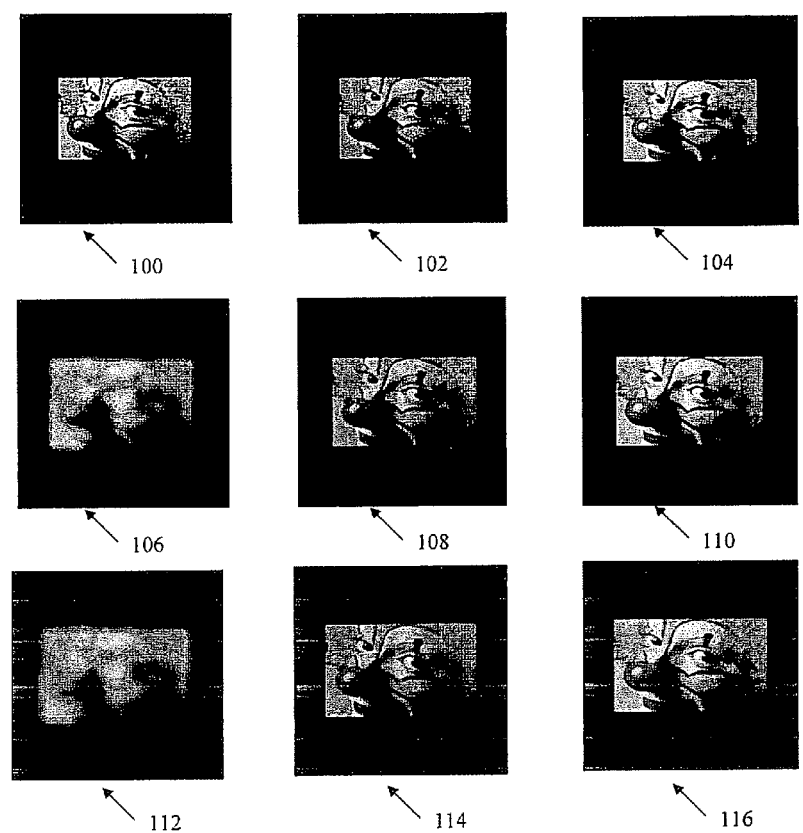
FIG. 10 illustrates images obtained with a single lens focused at $d_{object}=0.4$ m (left column) vs. images obtained with a CPM including a pseudo-random distribution of pixels within each super-pixel of the CPM (center column) vs. images obtained with a CPM including a regular periodic distribution of pixels within each super-pixel of the CPM (right column), for an object, depicting a clown, located at $d_{object}=0.4$ m ($1^{st}$ row), $d_{object}=0.367$ m ($2^{nd}$ row) and $d_{object}=0.353$ m ($3^{rd}$ row).

In FIG. 10 images of a clown are displayed for a variety of imaging systems and a variety of object distances, $d_{object}$. In the left column, the output of a single lens, the lens focused at $d_{object}=0.4$ m, is displayed for $d_{object}=0.4$ m ($1^{st}$ row) 100, the output of a single lens, the lens focused at $d_{object}=0.4$ m, is displayed for $d_{object}=0.367$ m ($2^{nd}$ row) 106, and the output of a single lens, the lens focused at $d_{object}=0.4$ m, is displayed for $d_{object}=0.353$ m ($3^{rd}$ row) 112. In the middle column, the output of an imaging system incorporating a composite phase mask 14 with a pseudo-random distribution according to the present invention, without any focus adjustment between images, is displayed for $d_{object}=0.4$ m ($1^{st}$ row) 102, $d_{object}=0.367$ m ($2^{nd}$ row) 108, and $d_{object}=0.353$ m ($3^{rd}$ row) 114. In the right column, the output of an imaging system incorporating a composite phase mask 14 with a regular periodic distribution according to the present invention, without any focus adjustment between images, is displayed for $d_{object}=0.4$ m ($1^{st}$ row) 104, $d_{object}=0.367$ m ($2^{nd}$ row) 110, and $d_{object}=0.353$ m ($3^{rd}$ row) 116. Object distances $d_{object}=0.4$ m, $d_{object}=0.367$ m and $d_{object}=0.353$ m correspond to an out of focus parameter for the single lens of $\Psi=0$, 10 and 15, respectively. While the sharply focused image 100 produced by the single lens is clearly the best of all the images in FIG. 10, images 108, 110, 114 and 116 produced by imaging systems of the present invention are clearly superior to the images 106 and 112 produced by a misfocused single lens.

In many applications, for example machine vision and CCD-based barcode readers, etc., contrast is an important, but not a crucial, parameter. According to the results of the simulations shown in FIGS. 9 and 10, it is apparent that imaging systems which use CPM 14 will find a wide range of applications.

While the present invention has been described as it applies to optical imaging using lenses, it will be obvious to those skilled in the art that the principles of the present invention mail be extended to other forms of imaging and other types of focusing mechanisms.

For example, the system of the present invention may be applied to the focusing of radio waves, microwaves, infrared radiation, ultraviolet radiation and other forms of electromagnetic radiation, as well as acoustic and shock waves. Imaging with ultraviolet radiation is becoming increasingly important, especially as the semiconductor industry continues to move to ever-smaller feature sizes in its products.

Other focusing mechanisms that can be used as alternatives to lenses include mirrors and holograms. For example, the present invention could be based on a Fresnel minor. The term "Fresnel mirror", as used herein, refers to a mirror that consists of concentric sections of focusing mirrors similar in concept to a Fresnel lens. As used herein, a Fresnel focusing mechanism refers to any focusing mechanism, such as a Fresnel lens or a Fresnel mirror, which incorporates the space-saving and/or weight-saving design principle seen in a Fresnel lens. A mirror including multiplexed sections of sparse Fresnel mirrors may be used as the corrective element in an imaging system according to the present invention. Also, the auxiliary focusing mechanism of an imaging system according to the present invention may include a mirror, such as a parabolic mirror or spherical mirror, or a hologram.

The scope of the present invention includes all of the above variations.

While the invention has been described with respect to a limited number of embodiments, it will be appreciated that many variations, modifications and other applications of the invention may be made.

What is claimed is:

1. An imaging system for focusing images on a detector, the imaging system comprising:
   (a) an optical axis; and
   (b) a plurality of mutually exclusive portions arranged transversely
   relative to said optical axis of the imaging system,
each said portion including a respective focusing mechanism that has a respective focal range that is different from said focal range of said respective focusing mechanism of any other said portion, said focusing mechanisms operative to produce on the detector respective substantially focused images of objects within said focal ranges and wherein at least one of said portions includes a plurality of discontiguous subportions and wherein said discontiguous subportions are sparsely distributed substantially throughout an aperture of the imaging system.

2. The system of claim 1 wherein the imaging system includes a plurality of sections, each said section including at least one said discontiguous subportion of at least one said portion.

3. The system of claim 2, wherein said sections are arranged in a tiling selected from the group consisting of triangular tiling, rectangular tiling, hexagonal tiling, and tiling of ellipses.

4. The system of claim 3, wherein said discontiguous subportions within each said section are arranged within said each section in a subtiling selected from the group consisting of triangular subtiling, rectangular subtiling, hexagonal subtiling and subtiling of ellipses.

5. The system of claim 4, wherein each said discontiguous subportion of each said portion occupies a respective relative position within each said section, said relative position within each said section being the same for all said discontiguous portions of any individual said portion.

6. The system of claim 4, wherein each said discontiguous subportion of each said portion occupies a respective relative position within each said section, said relative position within each said section being permitted to vary from section to section for all said discontiguous subportions of all said portions.

7. The system of claim 6, wherein said relative positions vary pseudo-randomly from section to section.

8. The system of claim 1, wherein said focusing mechanisms include Fresnel focusing mechanisms.

9. The system of claim 1, wherein each said focusing mechanism is a Fresnel lens.

10. The system of claim 1, wherein said portions are portions of a composite phase mask, and wherein the imaging system further includes:
    (c) an auxiliary focusing mechanism in tandem with said composite phase mask and the detector along said optical axis.

11. The system of claim 10, wherein said auxiliary focusing mechanism includes a lens.

12. The system of claim 10, wherein said auxiliary focusing mechanism includes a mirror.

13. The system of claim 10, wherein said auxiliary focusing mechanism includes a hologram.

14. The system of claim 1, wherein said portions produce substantially overlapping images on the detector.

15. The system of claim 1, wherein said focal ranges of said portions are mutually exclusive.

16. The system of claim 1, wherein said focal ranges of said portions at least partly overlap.

17. The system of claim 1, wherein said portions are portions of a diffractive optical element.

18. The imaging system of claim 1, wherein the imaging system is all-optical.

19. The imaging system of claim 1, wherein said aperture includes at least one nontransparent zone.

20. A method for focusing images of an object on a detector comprising the steps of:
    (a) providing an imaging system including:
        (i) an optical axis; and
        (ii) a plurality of mutually exclusive portions arranged transversely relative to said optical axis of said imaging system,
    each said portion including a respective focusing mechanism that has a respective focal range that is different from said focal range of said respective focusing mechanism of any other said portion, said focusing mechanisms operative to produce on the detector substantially focused images of objects within said focal ranges, and
    (b) having the object within said focal range of at least one of said focusing mechanisms,
    and wherein at least one of said portions includes a plurality of discontiguous subportions and wherein said discontiguous subportions are sparsely distributed substantially throughout an aperture of said imaging system.

21. The method of claim 20, wherein said imaging system is all-optical.

22. The method of claim 20, wherein said aperture includes at least one nontransparent zone.

* * * * *